United States Patent
Laurain

(10) Patent No.: US 9,217,676 B2
(45) Date of Patent: Dec. 22, 2015

(54) FREEZER FAILURE INDICATOR

(71) Applicant: Larry G. Laurain, Beaver Island, MI (US)

(72) Inventor: Larry G. Laurain, Beaver Island, MI (US)

(*) Notice: Subject to any disclaimer, the term of this patent is extended or adjusted under 35 U.S.C. 154(b) by 299 days.

(21) Appl. No.: 13/986,987

(22) Filed: Jun. 21, 2013

(65) Prior Publication Data

US 2014/0373772 A1    Dec. 25, 2014

(51) Int. Cl.
*G01K 11/06* (2006.01)

(52) U.S. Cl.
CPC ............ *G01K 11/06* (2013.01); *G01K 2207/06* (2013.01)

(58) Field of Classification Search
CPC ........ F25D 29/008; G01K 3/04; G01K 11/06; G01K 2207/04; G01K 2207/06
USPC .......... 116/215, 216, 217, 218, 219; 374/160, 374/161, 162, E3.004, E9.006; 62/125
See application file for complete search history.

(56) References Cited

U.S. PATENT DOCUMENTS

| | | |
|---|---|---|
| 2,662,018 A | 12/1953 | Smith |
| 2,823,131 A | 2/1958 | Power |
| 3,063,235 A * | 11/1962 | Winchell .................... 368/95 |
| 3,077,177 A * | 2/1963 | Winchell .................... 116/217 |
| 3,896,278 A | 7/1975 | Murawski et al. |
| 4,051,804 A | 10/1977 | Garnett |
| 4,114,443 A * | 9/1978 | Clark ......................... 116/217 |
| 4,327,117 A | 4/1982 | Lenack |
| 5,129,731 A * | 7/1992 | Ballin ........................ 374/106 |
| 5,924,294 A * | 7/1999 | Tiby ........................... 62/125 |
| 6,029,601 A | 2/2000 | Suya |
| 7,007,631 B2 * | 3/2006 | Von Seidel et al. ........ 116/216 |
| 7,845,305 B2 * | 12/2010 | Linke et al. ................ 116/216 |
| 8,028,533 B2 * | 10/2011 | Palin et al. .................. 62/66 |

FOREIGN PATENT DOCUMENTS

| | | | | |
|---|---|---|---|---|
| CH | 625618 A * | 9/1981 | ............ | G01K 11/06 |
| EP | 606033 A1 * | 7/1994 | ............ | G01K 11/06 |
| FR | 2529669 A1 * | 1/1984 | ............ | G01K 11/06 |
| FR | 2676532 A1 * | 11/1992 | ............ | F25D 11/00 |
| GB | 2235969 A * | 3/1991 | ............ | F25D 29/00 |
| GB | 2416842 A * | 2/2006 | ............ | G01K 11/06 |

\* cited by examiner

*Primary Examiner* — Richard A. Smith
(74) *Attorney, Agent, or Firm* — Alex Rhodes

(57) ABSTRACT

A failure indicator for informing an observer that food in the freezer is not fit to eat comprising: a closed transparent tubular housing; a cup shaped spacer in the interior of the tubular housing for dividing the tubular housing into a fluid storage space and a failure signaling space, having a group of small apertures for allowing fluid from the fluid storage space to enter the failure signaling space when a freezer fails; an opaque label surrounding the tubular housing; and a colored fluid in the housing for signaling whether the freezer has failed and food in the freezer is not fit to eat.

7 Claims, 4 Drawing Sheets

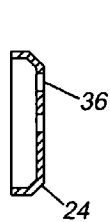
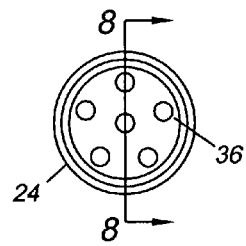
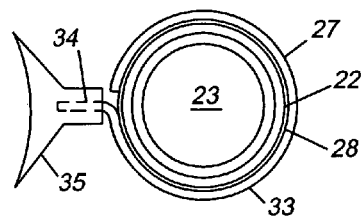
FIG. 8   FIG. 7                    FIG. 2
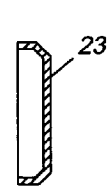
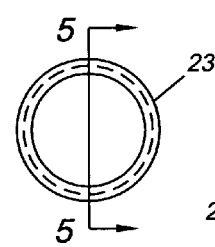
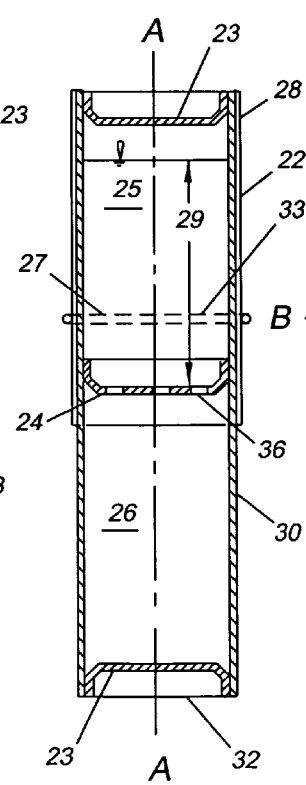
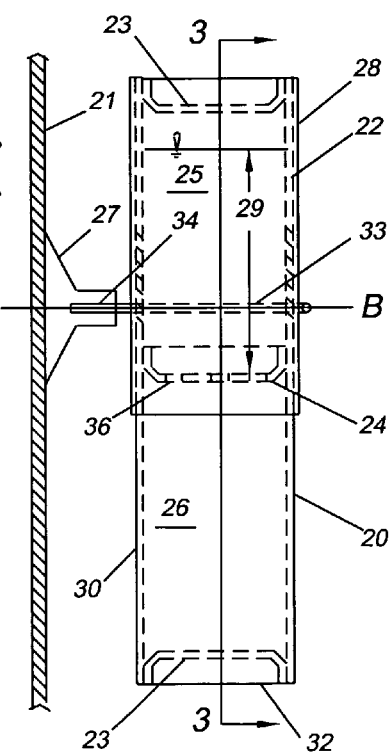
FIG. 5   FIG. 4
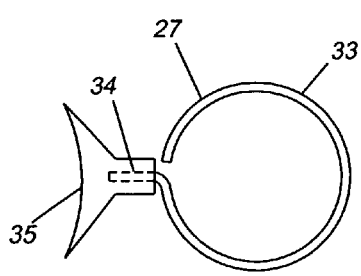
FIG. 6
FIG. 3
FIG. 1

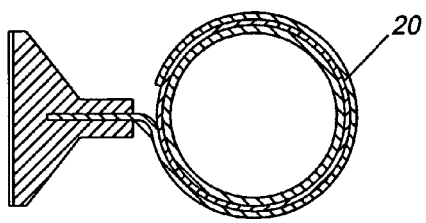
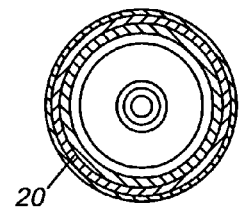
FIG. 16      FIG. 15
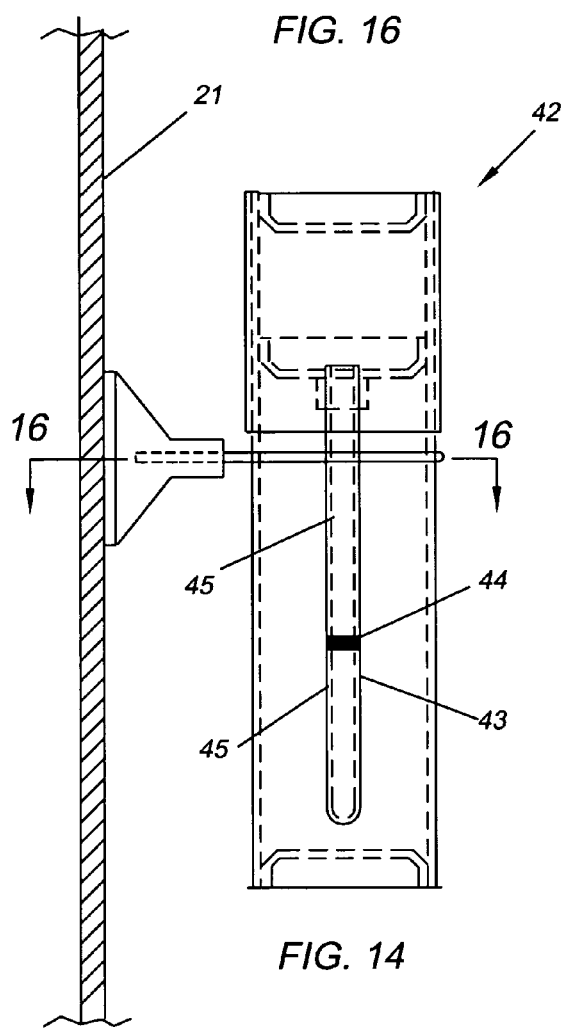
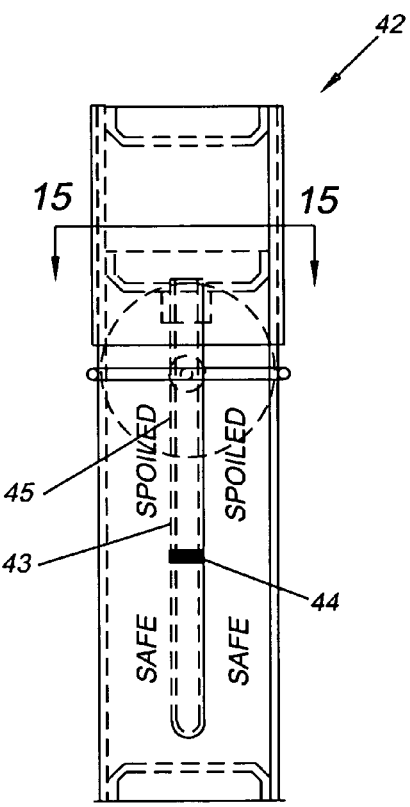
FIG. 14      FIG. 13

FREEZER FAILURE INDICATOR

FIELD OF THE INVENTION

This invention relates to measuring devices more particularly to a device for informing a user that a freezer has failed and food in the freezer is not fit to eat.

BACKGROUND OF THE INVENTION

Food begins to fail from the time it is harvested or slaughtered. Failure begins with an enzyme action that affects bacterial growth as food cells die. Food temperatures between 40° F. and 140° F. are known as "the food danger zone". Although in many cases spoiled food can be identified by smell, taste and appearance, harmful bacteria such as *salmonella* and *E. coli* occur without any physical signs, smells or tastes whatsoever.

Bacteria are really small, and it takes a lot of them to make us sick. To overcome food sicknesses, we merely have to stop multiplying or at least slow bacterial growth down. One method of slowing down spoilage is cold temperatures which retard bacterial growth. Cold temperature methods include refrigeration between 32° F. and 40° F. and freezing at 0° F.

One problem with cold temperature methods is that freezers and refrigerators are subject to mechanical and electric power failures. Power outages can occur several times when an owner is away from home. After power is restored, a freezer can function normally without leaving evidence that food has spoiled leaving them subject to bacterial infections. A need exists for informing returning owners that a freezer has failed and their food is not fit to eat. It can also be used to indicate that their food is not fit to eat in a refrigerator that has failed.

SUMMARY OF THE INVENTION

A stand alone apparatus is provided for signaling that a freezer or a refrigerator has failed and food inside the freezer is not fit to eat. The apparatus is comprised of a closed tubular housing divided into two spaces, a fluid storage space and a failure signaling space; a pair of cup shaped end caps for sealing opposite ends of the housing, a spacer in the interior of the housing, an opaque liquid, and an optional bracket for rotating the housing 180 degrees between a vertical set-up position and a vertical operating position.

The foregoing benefits together with the best mode of practicing the invention and additional benefits and features will become apparent from the ensuing detailed description of a preferred embodiment. The subject matter in which exclusive property rights are claimed is set forth in the numbered claims which are appended to the detailed description of the preferred embodiment.

In employing the teaching of the present invention, a plurality of alternate constructions can be provided to achieve the desired results and capabilities. In this disclosure, only several embodiments are presented for the purpose of disclosing my invention. However, these embodiments are intended as examples only and should not be considered as limiting the scope of my invention.

BRIEF DESCRIPTION OF THE DRAWINGS

FIG. 1 is a front view of a freezer failure indicator.
FIG. 2 is a plan view of the failure indicator.
FIG. 3 is a cross-sectional view taken on the line 2-2 in FIG. 1.
FIG. 4 is a front view of an end cap.
FIG. 5 a cross-sectional view taken on the line 5-5 in FIG. 4.
FIG. 6 is a front view of a mounting bracket.
FIG. 7 is a front view of another aspect of the invention.
FIG. 8 is a cross-sectional view taken on the line 8-8 in FIG. 7
FIG. 13 is a front view of another aspect of the invention.
FIG. 14 is a right end view of the other aspect.
FIG. 15 is a cross-sectional view taken on the line 15-15 in FIG. 13.
FIG. 16 is a cross-sectional view taken on the line 16-16 in FIG. 14.

DETAILED DESCRIPTION OF A PREFERRED EMBODIMENT

Figures 9, 10, 11, 12:
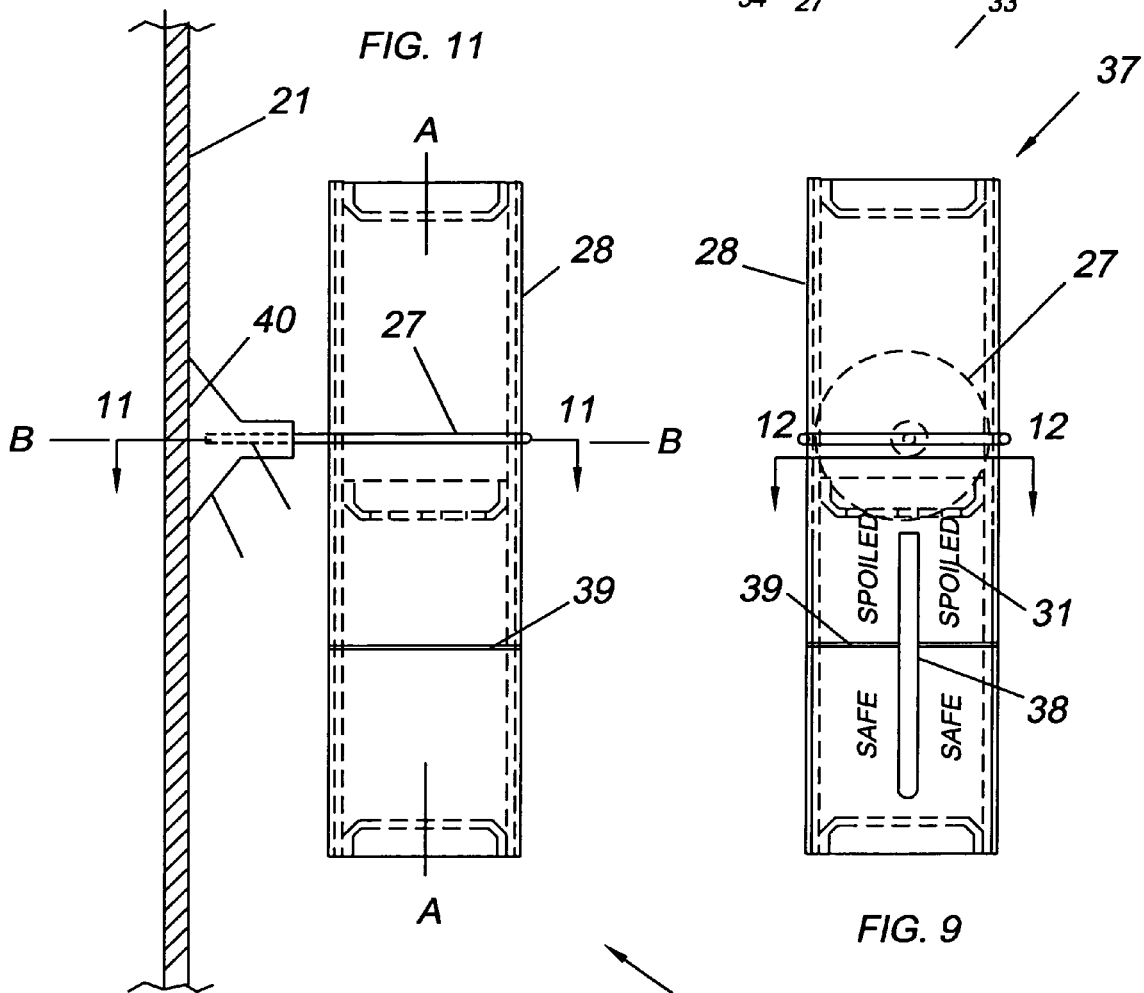
FIG. 9 is a front view of another aspect of the invention.
FIG. 10 is a right end view of the other aspect.
FIG. 11 is a cross-sectional view taken on the line 11-11 in FIG. 10.
FIG. 12 is a cross-sectional view taken on the line 12-12 in FIG. 9.

Referring now to the drawings wherein like numerals designate like and corresponding parts throughout the several views, in FIG. 1 trough 8, inclusive an indicator 20 is shown in an interior of a freezer 21 for informing owners returning from a vacation that their freezer 21 has failed and that food inside of the freezer 21 is not fit to eat. The failure indicator 20 is comprised of a closed transparent glass or plastic tubular housing 22, a pair of cup shaped end caps 23 for sealing the ends of the housing 22, a cup shaped spacer 24 in the interior of the housing 22 for dividing the housing into a fluid storage space 25 and a failure signaling space 26, an optional bracket 27, an opaque label 28, and a fluid 29, preferably water, inside of the housing 22. The size of the tubular housing 22 is about one and one-quarter inches diameter by 6 inches long.

With reference to FIGS. 1 and 2, one feature of the optional bracket 27 is that it is removable. Another feature of the bracket is that when the indicator 20 is mounted in the freezer 21, it can be rotated 180 degrees about a horizontal axis "B-B" between a vertical operating position 30 and a vertical set-up position (not shown). Another feature is that when the indicator is mounted in the freezer 21, it can be rotated about a vertical axis "A-A" to position indicia 31 (see FIG. 9) on the indicator 20 in clear view of an observer. When the bracket 27 is removed, the indicator can be supported on an end 32 during the operating 30 and set-up positions.

The bracket 27 is comprised of a spring wire circular portion 33 which surrounds the indicator 20, an outward extending wire straight portion 34 and a rubber suction cup 20 portion 35. The tubular housing 22 and suction cup 35 are held in the circular 33 and straight 34 spring wire portions by friction. Referring to FIG. 3, the cup shaped end caps 23 and cup shaped spacer 24 are resilient and press fitted in the tubular housing 22. As previously noted, the spacer cup 24 divides the housing into a fluid storage space 25 and a failure signaling space 26. As shown in FIG. 7, the spacer cup 24 has small apertures 36 which, as will be shown allow some of the fluid 29 to enter the failure indicating space 26. The opaque label 28 surrounds the tubular housing 22 by a small amount and covers the cup shaped spacer 24. The fluid 29 in the indicator 20 and label 28 are preferably red and blue respectfully.

The freezer failure indicator 20 is used in the following way. The indicator 20 is placed in a vertical position with the label 28 on the bottom. In this position, the indicator 20, previously pre-filled in an amount of fluid 29 which is below the cup shaped spacer 24 and obscured from view by the label 28. It should be noted that in the set up position, the water 29 containing a dye is obscured from view by the label 28. The indicator 20 is placed in the freezer 21, supported on a lower end 32 if the bracket 27 has been removed. If the bracket 27 has not been removed, the indicator 20 is attached with the suction cup 35 to a side wall of the freezer 21 or to an inside surface of a freezer door. The indicator 20 is rotated about axis A-A to position indicia 31, if any, on the indicator 20 in clear view of an observer.

The indicator 20 is left in this position until the water 29 freezes. After the water 29 is frozen, the indicator 20 is rotated 180 degrees to position the frozen water 29 in the uppermost portion of the indicator 20. The indicator 20 is now in its operating position 30. If a freezer failure occurs for a prolonged time, the ice will thaw, causing 20 some colored water 29 to flow through the apertures 36 in the cup shaped spacer 24, into the freezer failure signaling space 26, thereby informing the owner that his freezer has failed and the food in the freezer may not be fit to eat. The spacer 24 prevents ice during thawing from dropping into the failure signaling space 26 of the indicator 20. By judging the height of the water 29, an observer can estimate the extent of the failure.

If the indicator 20 is to be used in the food compartment of a refrigerator, a colloid forming substance such as gelatin is added to the water in an amount which forms a semi-solid colloidal gel above 32 degrees F. and liquefies when the temperature is less that 32 degrees F.

In FIGS. 9 through 12, inclusive, a second aspect 37 of the invention is illustrated wherein indicia 31 is added to the indicator 20 to specifically inform an observer that food is fit or not fit to eat after one or more partial significant failures and recoveries. In this aspect 37, the entire surface of the tubular housing 22 is covered with the label 28. In the label 28 there is a vertical slotted opening 38 which exposes fluid 29 which has entered the failure signaling space 26 of the failure indicator 20. A horizontal line 39 on the label 28 and indicia 31 designate the height of the fluid 29 wherein the food is safe to eat or spoiled and unfit to eat. An alternate way for attaching the indicator 20 to the freezer is shown. The suction cup 35 of the bracket 27 has been replaced with a pre-coated adhesive 40 and a peel-off paper 41 for retaining the indicator 20 to the freezer wall 21.

In FIGS. 13 through 16, another aspect 42 is shown which resembles a thermometer. The slotted opening 38 in the FIG. 9 through 12 aspect is replaced by a 20 transparent tube 43 with a graduation mark 44 on the tube 43 that designates a region 45 wherein food is unsafe to eat. In the event thawing occurs because of freezer 21 failure for a length of time wherein the height of the colored water is above the graduation mark, indicia 31 on the housing 22 informs an observer that the food is spoiled.

Figure 18:
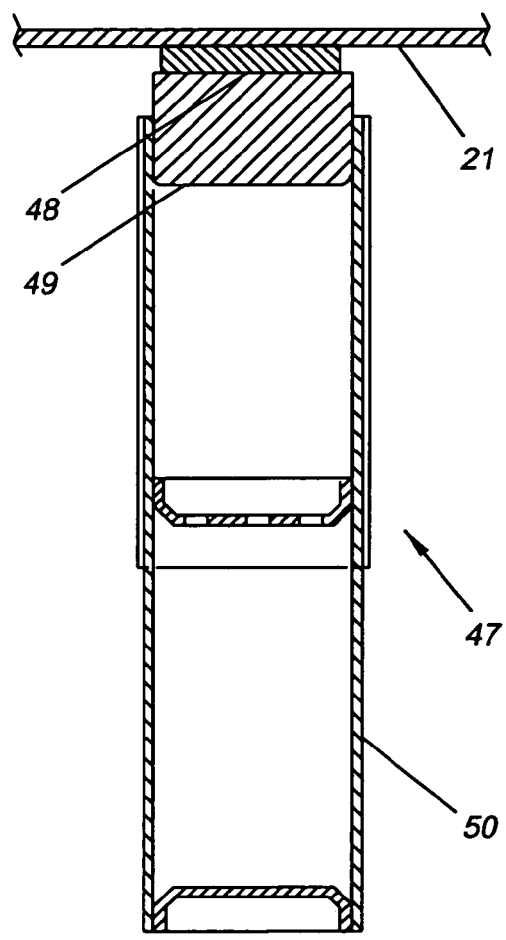
FIG. 18 is a cross-sectional view taken on the line 18-18 in FIG. 17.
Figure 17:
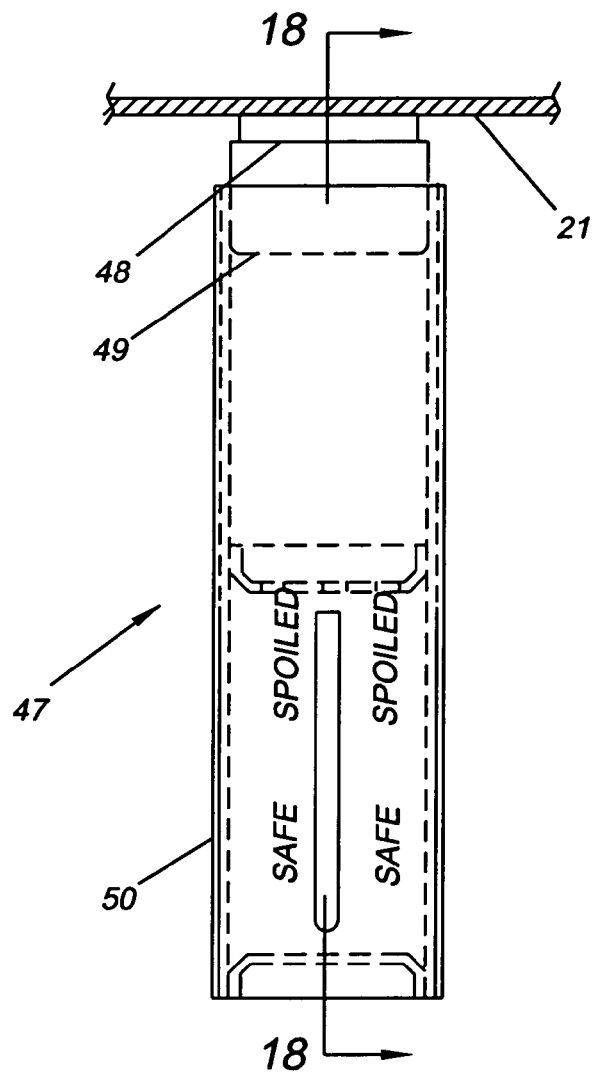
FIG. 17 is a front view of another aspect of the invention.

In FIGS. 17 and 18 an aspect 47 of the invention is shown wherein the failure indicator 50 is attached to an upper wall 21 of a freezer with a magnet 48. In this aspect, the magnet 48 is adhesively attached to a rubber-like plug 49 which seals an end of the failure indicator 50.

From the above, it is apparent that my invention provides an affordable, attractive, and easy to use device for informing people returning after an prolonged absence that their refrigerator or freezer has failed one or numerous times and food is not fit to eat.

Although only a single embodiment and method have peen illustrated and described, it is obvious that other embodiments can be derived by changes well known to persons skilled in the art, without departing from the spirit thereof.

What I claim is new is:

1. A failure indicator for informing an observer that a freezer has failed and food in the freezer is not fit to eat comprising: a closed transparent tubular housing, a resilient wire bracket for mounting said failure indicator for rotation about a pair of crossed vertical and horizontal axes; said bracket having a circular portion for engaging said tubular housing and an outward extending straight portion for retaining said tubular housing to a rubber-like suction cup; said rubber-like suction cup for attaching said failure indicator to an interior surface of said freezer, a pair of cup shaped end caps for sealing opposite end portions of said tubular housing; a cup shaped spacer in the interior of said tubular housing for dividing said tubular housing into a fluid storage space and a failure signaling space, said interior cup shaped spacer having a group of small apertures for allowing fluid from said fluid storage space to enter said failure signaling space; an opaque label surrounding said tubular housing; and the fluid in said housing for signaling whether said freezer has failed and food in said freezer is not fit to eat.

2. The failure indicator as recited in claim 1 wherein said label covers the entire cylindrical surface of said housing.

3. The failure indicator as recited in claim 2 wherein said label has an open slot 25 for viewing fluid in said fluid signaling space and indicia for informing an observer that said freezer has failed and food inside of said freezer is unfit to eat.

4. The failure indicator as recited in claim 2 wherein said fluid and said label are colored red and blue, respectfully.

5. A failure indicator for informing an observer that a freezer has failed and food in the freezer is not fit to eat comprising: a closed transparent tubular housing, a resilient removable wire bracket for rotatably mounting said failure indicator about a pair of crossed vertical and horizontal axes; said bracket having a circular portion for engaging said tubular housing and an outward extending straight portion for retaining said tubular housing to an adhesive coated member, the adhesive coated member for attaching said failure indicator to an interior surface of said freezer, said failure indicator having a first vertical set-up position with liquid fluid in the lower portion of said tubular housing and a second operating position with said fluid being frozen in an upper portion of said tubular housing, a pair of cup shaped end caps for sealing opposite end portions of said tubular housing; a cup shaped spacer in the interior of said tubular housing for dividing said tubular housing into a fluid storage space and a failure signaling space, said interior cup shaped spacer having a group of small apertures for allowing fluid from said fluid storage space to enter said failure signaling space; an opaque label surrounding said tubular housing; and a fluid in said tubular housing for signaling whether said freezer has failed and food in said freezer is not fit to eat.

6. A failure indicator for informing an observer that a freezer has failed and food in the freezer is not fit to eat comprising: a closed transparent tubular housing, a small diameter transparent tubular member in the interior of said tubular housing, said small diameter tubular member having an axis which is co-linear with an axis of said tubular housing and indicia on said small diameter tubular member and said tubular housing for signaling whether the freezer has failed and food in said freezer is unfit to eat; a resilient removable wire bracket for rotatably mounting said failure indicator about a pair of crossed vertical and horizontal axes; said bracket having a circular portion for engaging said tubular housing and an outward extending straight portion for retaining said tubular housing to a rubber-like suction cup; a rubber-like suction cup for attaching said failure indicator to an interior surface of said freezer, said failure indicator having a first vertical set-up position with liquid fluid in the lower portion of said small tubular member and a second operating position with said fluid being frozen in an upper portion of said small tubular member, a pair of cup shaped end caps for sealing opposite end portions of said tubular housing; a cup shaped spacer in the interior of said tubular housing for dividing said tubular housing into a fluid storage space and a failure signaling space, said interior cup shaped spacer having a group of small apertures for allowing fluid from said fluid storage space to enter said failure signaling space; an opaque label surrounding said tubular housing; and a fluid in said housing for signaling whether said freezer has failed and food in said freezer is not fit to eat.

7. The failure indicator as recited in claim 6 wherein said indicia on said small diameter tubular member is a graduation mark.

\* \* \* \* \*